United States Patent [19]

Mori et al.

[11] Patent Number: 4,977,485
[45] Date of Patent: Dec. 11, 1990

[54] MONOLITHIC CERAMIC CAPACITOR

[75] Inventors: Yoshiaki Mori; Hiroshi Takagi; Yukio Sakabe, all of Nagaokakyo, Japan

[73] Assignee: Murata Manufacturing Co., Ltd., Kyoto, Japan

[21] Appl. No.: 377,410

[22] Filed: Jul. 10, 1989

[30] Foreign Application Priority Data

Jul. 11, 1988 [JP] Japan .................................. 63-172450

[51] Int. Cl.⁵ .................................................. H01G 4/12
[52] U.S. Cl. ............................................................ 361/321
[58] Field of Search ................ 361/308, 309, 310, 320, 361/321

[56] References Cited

U.S. PATENT DOCUMENTS

| 4,101,952 | 7/1978 | Burn | 361/320 X |
| 4,353,153 | 10/1982 | Prakash | 361/309 X |
| 4,451,869 | 5/1984 | Sakabe et al. | |
| 4,700,266 | 10/1987 | Chazono et al. | 361/321 |
| 4,701,827 | 10/1987 | Fujikawa et al. | 361/309 |

FOREIGN PATENT DOCUMENTS

| 0159869 | 10/1985 | European Pat. Off. |
| 0238241 | 9/1987 | European Pat. Off. |
| 1171284 | 9/1958 | France |
| 2535313 | 5/1984 | France |

Primary Examiner—Donald A. Griffin
Attorney, Agent, or Firm—Wenderoth, Lind & Ponack

[57] ABSTRACT

A monolithic ceramic capacitor which comprises a laminate composed of a plurality of dielectric ceramic layers and internal electrode layers provided between said dielectric ceramic layers, and external electrodes provided at both ends of said laminate and electrically connected to said internal electrode layers, said dielectric ceramic layer being a dielectric ceramic containing lead oxide and a reduction inhibitor and said internal electrode layer being copper or a copper alloy.

5 Claims, 2 Drawing Sheets

MONOLITHIC CERAMIC CAPACITOR

FIELD OF THE INVENTION

The present invention relates to a monolithic ceramic capacitor.

BACKGROUND OF THE INVENTION

A monolithic ceramic capacitor has a laminated structure obtained by preparing ceramic green sheets, forming a layer of metal paste for internal electrodes on each ceramic green sheet, stacking them and firing the resulstant stacked body. In comparison with the conventional condenser, such a monolithic capacitor is advantageous because it is small-sized and has a large capacity. Therefore, it has been already put into practical use.

As a dielectric material of a monolithic ceramic capacitor, recently, a dielectric ceramic containing lead has been widely used because a relatively high dielectric constant can be obtained and sintering can be carried out at low temperature. When such a dielectric is sintered in a reducing atmosphere, insulating characteristics are deteriorated. Therefore, sintering is carried out in an oxidizing atmosphere and, in general, as an internal electrode material which is sintered together with the dielectric simultaneously, there is used a noble metal such as stable silver-palladium alloy or the like which is not oxidized, dissolved and reacted with the dielectric even if sintering is carried out in an oxidizing atmosphere.

However, since a silver-palladium alloy is extremely expensive, the production cost becomes expensive. Further, there are disadvantages that properties are deteriorated by migration of silver during use and equivalent series resistance becomes large because of a small conductivity.

OBJECTS OF THE INVENTION

The present inventors have found that a monolithic ceramic capacitor which maintains a high dielectric constant of a conventional dielectric ceramic containing lead oxide and has an insulation resistance of not lower than $10^{10}$ Ω cm can be obtained at a low cost by using copper or a copper alloy as an internal electrode.

The main object of the present invention is to provide a monolithic ceramic capacitor having a high dielectric constant as well as an excellent insulation resistance of not lower than $10^{10}$ Ω cm.

This object as well as other objects and advantages of the present invention will become apparent to those skilled in the art from the following description with reference to the accompanied drawings.

Figure 1A:
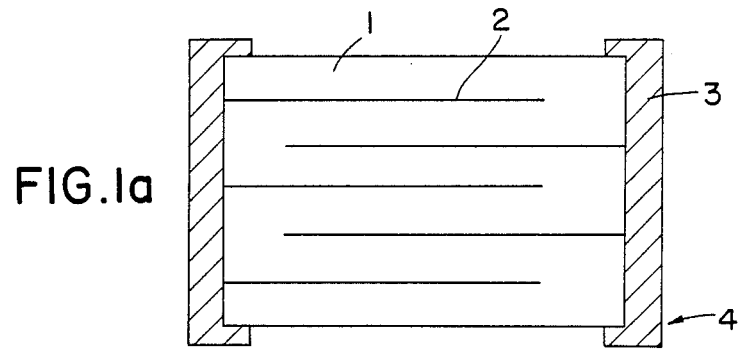
FIGS. 1a, 1b and 1c. are schematic cross sections illustrating embodiments of the monolithic ceramic capacitor of the present invention, respectively.

SUMMARY OF THE INVENTION to the present invention, there is provided a monolithic ceramic capacitor which comprises a laminate composed of a plurality of dielectric ceramic layers and internal electrode layers provided between said dielectric ceramic layers, and external electrodes provided at both ends of said laminate and electrically connected to said internal electrode layers, said dielectric ceramic layer being a dielectric ceramic containing lead oxide and a reduction inhibitor and said internal electrode layer being copper or a copper alloy.

Further, by using copper or a copper alloy to which glass frit is added, or copper or a copper alloy to which the above dielectric ceramic powder and/or reduction inhibitor are added as the internal electrode, a monolithic ceramic capacitor having improved delamination resistance can be obtained.

DETAILED DESCRIPTION OF THE INVENTION

The dielectric ceramic powder used in the present invention is not limited to a specific one and a known dielectric ceramic containing lead oxide can be used. For example, there can be used a known dielectric ceramic containing lead oxide having the composition represented by the general formula:

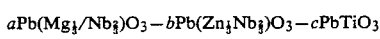

$$a\text{Pb}(Mg_{\frac{1}{3}}Nb_{\frac{2}{3}})O_3 - b\text{Pb}(Zn_{\frac{1}{3}}Nb_{\frac{2}{3}})O_3 - c\text{PbTiO}_3$$

wherein a, b and c are constants, respectively. Such a dielectric ceramic powder is obtained by wet-mixing predetermined amounts of $Pb_3O_4$, $MgCO_3$, $Nb_2O_5$, $TiO_2$ and $ZnO$ in a ball mill, evaporating and drying the mixture to give a powder mixture, sintering the powder mixture, grinding and sieving the sintered mixture.

The reduction inhibitor in the present invention is, for example, a material having the composition represented by the general formula:

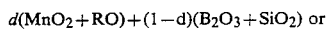

$$d(MnO_2 + RO) + (1-d)(B_2O_3 + SiO_2) \text{ or}$$

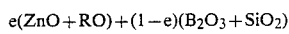

$$e(ZnO + RO) + (1-e)(B_2O_3 + SiO_2)$$

wherein RO is at least one component selected from the group consisting of MgO, CaO, SrO and BaO, and d and e are constants, respectively. Usually, the reduction inhibitor is obtained by wet-mixing and grinding predetermined amounts of the oxide, carbonate or hydroxide of the respective components in a ball mill, evaporating and drying the mixture to give a powder mixture, retaining the powder mixture in an alumina crucible, quenching the mixture to vitrify it and grinding and sieving the mixture. However, the present invention is not limited to the above composition.

The amount of the reduction inhibitor to be added is not specifically limited but, usually, it is 0.05 to 50% by weight based on the total amount of the dielectric ceramic powder.

The laminate of the present invention is obtained by admixing a desired amount of the reduction inhibitor and the dielectric ceramic powder, adding thereto a binder such as polyvinyl butyral binder and an organic solvent such as ethanol, wet-mixing the mixture in a ball mill, molding the mixture according to a known method such as doctor blade method, drying the molded material to give a ceramic green sheet having a suitable size and applying a metal paste as the internal electrode on the sheet according to a known method such as printing, laminating several sheets thus obtained and sintering the sheet.

The main component of the internal electrode of the present invention is copper or a copper alloy such as platinum-copper or palladium-copper. There can be also used copper or a copper alloy containing glass frit such as lead borosilicate or bismuth borosilicate, or copper or a copper alloy containing the above dielectric ceramic powder and/or reduction inhibitor. The amount of these additives is not limited to a specific one so far as they do not adversely affect the properties of the laminated ceramic condenser. Usually, glass frit can be added 0.5 to 30% by weight based on the total weight of the internal electrode. The dielectric ceramic powder and the reduction inhibitor can be added 0.05 to 40% by weight and 0.01 to 30% by weight based on the total weight of the internal electrode.

As the external electrode of the present invention, there can be used copper or the copper alloy as described above, or copper or the copper alloy wherein the glass frit, dielectric powder and/or reduction inhibitor is added as described above. Or, silver or silver-palladium alloy or the like can be used. The external electrode can be suitably selected according to applications and purposes of the monolithic capacitor.

Hereinafter, the preferred embodiments of the present invention are explained in detail with reference to the accompanying drawings.

Figure 1B:
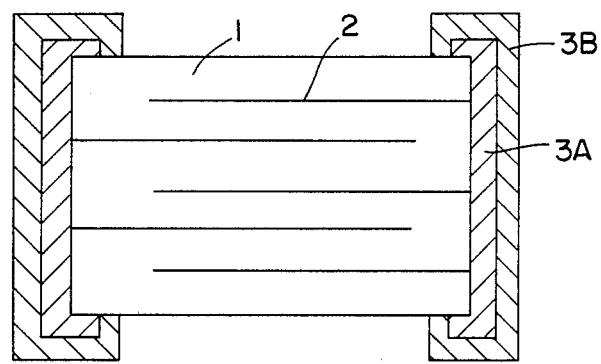
Figure 1C:
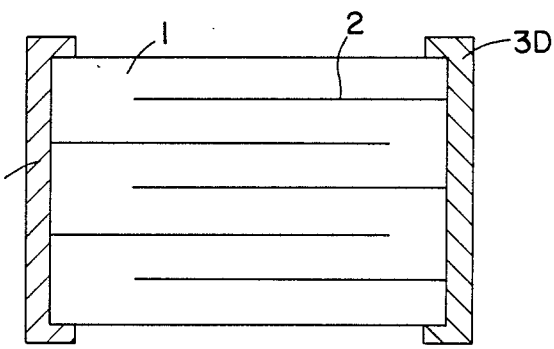

FIGS. 1a, 1b and 1c are schematic cross sections illustrating embodiments of the monolithic ceramic capacitor of the present invention, respectively.

The typical structure of the capacitor of the present invention is a laminate structure as illustrated in FIG. 1a. For example, the capacitor is produced as follows. Firstly, a metal paste for an internal electrode 2 is printed on a green sheet dielectric ceramic 1 by means of a known screen printing method. Then, several printed sheet are laminated and heat bonded to give an unsintered laminate. Then, the resulting unsintered laminate 4 is sintered. When the laminate of the present invention composed of the green sheet as the dielectric ceramic containing lead oxide and the metal paste as the internal electrode of copper is sintered, it is necessary to maintain the laminate in an atmosphere of oxygen partial pressure where the dielectric is not reduced and the internal electrode is not oxidized. That is, when the dielectric is oxidized, insulation resistance is lowered. On the other hand, when the internal electrode is oxidized, equivalent series resistance is increased. Therefore, the function as a capacitor is lost in either case.

Figure 2:
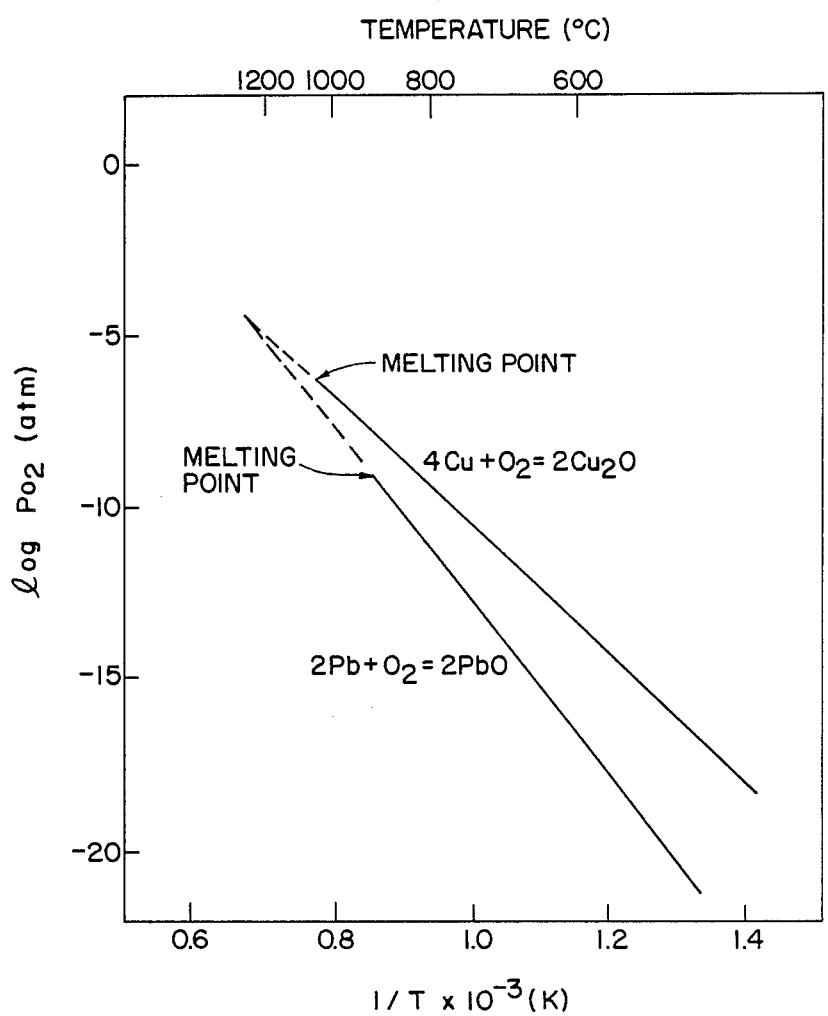
FIG. 2 is a graph illustrating the relation between oxygen partial pressure for lead or copper and temperature.

A relation between oxygen partial pressure for copper or a copper alloy and temperature is disclosed by L. S. Darkeh, R. W. Gurry et al., Physical Chemistry of Metals (1953). As seen from FIG. 2, copper is not oxidized at the region under the straight line represented by the reaction formula $4Cu + O_2 = 2Cu_2O$ and lead oxide is not reduced at the region above the straight line represented by the reaction formula $2Pb + O_2 = 2PbO$. Accordingly, it is most preferred to sinter the laminate in the region surrounded by two straight lines, theoretically. However, this region is very narrow (e.g., oxygen partial pressure is about $5 \times 10^{-7}$ to about $8 \times 10^{-8}$ atm at 1000° C.) and, in practice, it is difficult to control the oxygen partial pressure at this range. In this respect, according to the present invention, by addition of the reduction inhibitor to the dielectric, oxygen partial pressure of a atmosphere which can be employed in sintering is particularly extended toward a low oxygen partial pressure side so that the product in high quality can be obtained in a high yield in a suitable atmosphere without controlling oxygen partial pressure strictly. After sintering, a metal paste as the external electrode 3 is applied so that each dielectric layer is parallel-connected and baked to obtain the monolithic ceramic capacitor 4. In another embodiment of the present invention as illustrated in FIG. 1b, the external electrode 3A of a certain metal (e.g., copper) is formed and, further, the external electrode 3B of another metal (e.g., silver) is formed thereon. In still another embodiment of the present invention as illustrated in FIG. 1c, the external electrodes 3C and 3D wherein the electrode at each side is made of different metal (e.g., copper alloy, palladium and the like) are formed.

The metal paste used as the internal electrode 2 and external electrode 3 is, for example, that obtained by adding an organic varnish such as ethyl cellulose to a metal powder having particle size of about 0.1 to 5 μm and then dispersing the mixture in a solvent such as α-terpineol. The thickness of the internal electrode layer and the external electrode varies depending upon a capacitance of the capacitor it is preferably about 0.5 to 5 μm and about 10 to 80 μm, respectively.

As described hereinabove, according to the present invention, since copper or a copper alloy, copper or a copper alloy containing glass frit, or copper or a copper alloy containing the dielectric ceramic powder and/or reduction inhibitor are used as the internal electrode, a capacitor having a high dielectric constant wherein migration in the internal electrode is prevented can be obtained at low cost. Further, since the reduction inhibitor is added to the dielectric ceramic powder, the monolithic ceramic capacitor having high dielectric constant as well as excellent insulation resistance of not lower than $10^{10}$ Ωcm can be obtained even if sintering is carried out in a reducing atmosphere.

The following Examples and Comparative Examples further illustrate the present invention in detail but are not to be construed to limit the scope thereof.

EXAMPLE 1

The production conditions and electrical properties of the monolithic ceramic capacitors according to this Example are shown in Tables 1 and 2 below.

Preparation of reduction inhibitor

In order to obtain a reduction inhibitor having a composition represented by the general formula:

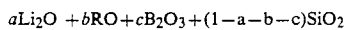

wherein RO is at least one component selected from the group consisting of MgO, CaO, SrO and BaO, and a, b, c and d are constants, respectively, and containing the respective components in the proportions as shown in Table 1, oxide, carbonate or hydroxide of the components are mixed, ground, evaporated and dried to give a powder mixture. The powder mixture is retained in an alumina crucible at 1300° C. for one hour and then quenched to vitrify the mixture. The mixture is granulated so that the resulting powder can be passed through 200 mesh screen.

Preparation of dielectric ceramic powder

In order to obtain a dielectric ceramic powder of the composition represented by the general formula:

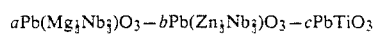

wherein a, b and c are constants, respectively, and containing the respective components in the proportion as shown in Table 2, predetermined amounts of $Pb_3O_4$, $MgCO_3$, $Nb_2O_5$, $TiO_2$ and ZnO are wet-mixed for 16 hours in a ball mill and evaporated and dried to give a powder mixture. Then, the powder mixture is sintered at 680° to 730° C. for 2 hours in a zirconia box, and granulated so that the resulting powder could be passed through 200 mesh screen.

To the dielectric ceramic powder thus prepared is added the above vitrified reduction inhibitor in the proportion as shown in Tables 1 and 2 and polyvinyl butyral binder and ethanol are added thereto. Then, the mixture is wet-mixed for 16 hours in a ball mill to give a powder mixture.

In Table 1, examples of the present invention (Sample Nos. 1 to 12) are those wherein the respective reduction inhibitors containing the components in various proportions are added to one kind of the dielectric powder having the composition [80Pb(Mg$_{\frac{1}{3}}$Nb$_{\frac{2}{3}}$)O$_3$−15Pb(Zn$_{\frac{1}{3}}$Nb$_{\frac{2}{3}}$)O$_3$−5PbTiO$_3$] (mol %)]. The examples of the present invention in Table 2 (Sample Nos. 1 to 15) are those wherein one kind of the reduction inhibitor having the composition [(5Li$_2$O+15BaO+15CaO+10SrO+5MgO+20B$_2$O$_3$ 30SiO$_2$) (mol %)] is added to the respective dielectric ceramic powders containing the components in various proportions.

The above-obtained powder mixture is molded in sheet according to doctor blade method, dried and then cut in a suitable size to give a sheet of the dielectric ceramic. A copper paste is printed on the one side of the resulting sheet according to screen printing method to form an internal electrode and the resulting sheet is laminated as shown in FIG. 1 and heat bonded to give a laminate. The unsintered laminate thus obtained is sintered in a reducing atmosphere of a mixed gas of N$_2$, H$_2$ and H$_2$O at 730° C. to 1050° C. for 2 hours. After sintering, silver paste is applied on both ends of the laminate and baked in nitrogen atmosphere at 800° C. to form external electrodes electrically connected with the internal electrodes to obtain the monolithic ceramic capacitor. The size of the capacitor is as follows.

Size of capacitor

External size:
Width: 4.8 mm
Length: 5.6 mm
Thickness: 1.2 mm
Thickness of effective dielectric layer: 32 μm
Number of dielectric layer: 17
Thickness of internal electrode: 3 μm
Area of internal electrode: 21.5 mm$^2$
Thickness of external electrode : 60 μm The resulting capacitor is dipped in a fuchsin solution to examine a degree of sintering and the optimum sintering temperature is determined.

Regarding a sample of the resulting monolithic ceramic capacitor, the dielectric constant ($\epsilon$) and the dielectric loss (tan δ) under conditions of 25° C., 1 KHz and 1 V.r.m.s., and temperature characteristics of the dielectric constant at the range between −25° C. to +85° C. with taking +20° C. as the reference temperature are measured. The results are shown in Tables 1 and 2.

The symbols B, C, D, E and F herein used with respect to temperature characteristics mean the characteristics specified by JIS (Japanese Industrial Standard). The characteristics are as follows.

B characteristics: The rate of capacitance change at the range between −25° C. and +85° C. with taking the capacitance at +20° C. as the reference does not exceed the range of −10 to +10%.

C characteristics: The rate of capacitance change at the range between −25° C. and +85° C. with taking the capacitance at +20° C. does not exceed the range of −20 to 20%.

D characteristics: The rate of capacitance change at the range between −25° C. and +85° C. with taking the capacitance at +20° C. does not exceed the range of −30 to 20%.

E characteristics: The rate of capacitance change at the range between −25° C. and +85° C. with taking the capacitance at +20° C. does not exceed the range of −55 to 20%.

F characteristics: The rate of capacitance change at the range between −25° C. and +85° C. with taking the capacitance at +20° C. does not exceed the range of −80 to 30%.

COMPARATIVE EXAMPLE 1

According to the same manner as described in Example 1, a monolitic ceramic capacitor (Sample No. 13 in Table 1) is produced except that any reduction inhibitor is not added to the dielectric ceramic powder having the composition of 80Pb(Mg$_{\frac{1}{3}}$Nb$_{\frac{2}{3}}$)O$_3$−15Pb(Zn$_{\frac{1}{3}}$Nb$_{\frac{2}{3}}$)O$_3$−5PbTiO$_3$ (mol %). The electrical characteristics are measured according to the same manner as described in Example 1. The results are shown in Table 1.

TABLE 1

| Sample Nos. | Dielectric ceramic powder (wt %) | Reduction inhibitor (wt %) | Composition of reduction inhibitor (mol %) | | | | | | | Sintering temperature (°C.) | Electrical characteristics | | | |
|---|---|---|---|---|---|---|---|---|---|---|---|---|---|---|
| | | | Li$_2$O | BaO | CaO | SrO | MgO | B$_2$O$_3$ | SiO$_2$ | | Dielectric constant ($\epsilon$) | Dielectric loss (tan δ (%)) | Insulation resistance (Ω·cm) | Temperature characteristics |
| 1 | 99 | 1 | 6 | 54 | 0 | 0 | 0 | 20 | 20 | 1050 | 12500 | 2.6 | ≧10$^{10}$ | F |
| 2 | 99 | 1 | 6 | 0 | 10 | 0 | 0 | 34 | 50 | 1000 | 10300 | 2.8 | " | F |
| 3 | 99 | 1 | 19 | 10 | 10 | 5 | 5 | 20 | 31 | 1030 | 12000 | 2.9 | " | F |
| 4 | 99 | 1 | 5 | 10 | 10 | 5 | 5 | 39 | 26 | 1000 | 11600 | 2.9 | " | F |
| 5 | 99 | 1 | 5 | 15 | 15 | 10 | 5 | 20 | 30 | 1000 | 11800 | 2.5 | " | F |
| 6 | 98 | 2 | " | " | " | " | " | " | " | 980 | 9900 | 2.3 | " | F |
| 7 | 95 | 5 | " | " | " | " | " | " | " | 950 | 6100 | 2.2 | " | E |
| 8 | 90 | 10 | " | " | " | " | " | " | " | 910 | 2300 | 1.8 | " | D |
| 9 | 85 | 15 | " | " | " | " | " | " | " | 890 | 1900 | 1.5 | " | C |
| 10 | 80 | 20 | " | " | " | " | " | " | " | 850 | 1500 | 0.8 | " | C |
| 11 | 70 | 30 | " | " | " | " | " | " | " | 770 | 950 | 0.2 | " | B |
| 12 | 60 | 40 | " | " | " | " | " | " | " | 730 | 600 | 0.1 | " | B |
| 13 | 100 | 0 | — | — | — | — | — | — | — | 1050 | 890 | 15.0 | 10$^6$ | C |

Note:
Sample Nos. 1 to 12: Example, Sample No. 13: Comparative Example

TABLE 2

| Sample Nos. | Reduction inhibitor (wt %) | Dielectric ceramic powder (wt %) | Composition of dielectric ceramic powder (wt %) | | | Sintering temperature (°C.) | Electric characteristics | | | Temperature characteristics |
|---|---|---|---|---|---|---|---|---|---|---|
| | | | $Pb(Mg_{1/3}Nb_{2/3})O_3$ | $Pb(Zn_{1/3}Nb_{2/3})O_3$ | $PbTiO_3$ | | Dielectric constant ($\epsilon$) | Dielectric loss (tan δ (%)) | Insulation resistance (Ω · cm) | |
| 1 | 1.0 | 99.0 | 89.0 | 1.0 | 10.0 | 1030 | 14900 | 2.9 | $\geq 10^{10}$ | F |
| 2 | 1.0 | 99.0 | 80.0 | 10.0 | 10.0 | 1000 | 12800 | 3.2 | " | F |
| 3 | 1.0 | 99.0 | 80.0 | 15.0 | 5.0 | 990 | 12000 | 2.7 | " | F |
| 4 | 1.0 | 99.0 | 98.5 | 1.0 | 0.5 | 1000 | 10000 | 1.9 | " | F |
| 5 | 1.0 | 99.0 | 59.5 | 40.0 | 0.5 | 1000 | 11500 | 3.8 | " | F |
| 6 | 10.0 | 90.0 | 89.0 | 1.0 | 10.0 | 910 | 3200 | 1.9 | " | D |
| 7 | 10.0 | 90.0 | 80.0 | 10.0 | 10.0 | 900 | 3000 | 2.2 | " | D |
| 8 | 10.0 | 90.0 | 80.0 | 15.0 | 5.0 | 900 | 2950 | 1.7 | " | D |
| 9 | 10.0 | 90.0 | 98.5 | 1.0 | 0.5 | 900 | 2900 | 0.8 | " | D |
| 10 | 10.0 | 90.0 | 59.5 | 40.0 | 0.5 | 900 | 3000 | 2.1 | " | D |
| 11 | 20.0 | 80.0 | 89.0 | 1.0 | 10.0 | 850 | 1600 | 0.9 | " | C |
| 12 | 20.0 | 80.0 | 80.0 | 10.0 | 10.0 | 850 | 1550 | 0.9 | " | C |
| 13 | 20.0 | 80.0 | 80.0 | 15.0 | 5.0 | 850 | 1500 | 0.7 | " | C |
| 14 | 20.0 | 80.0 | 98.5 | 1.0 | 0.5 | 850 | 1500 | 0.4 | " | C |
| 15 | 20.0 | 80.0 | 59.5 | 40.0 | 0.5 | 850 | 1550 | 1.0 | " | C |

EXAMPLE 2

According to the same manner as described in Example 1, monolithic ceramic capacitors (Sample Nos. 1 to 12 in Table 3 and Sample Nos. 1 to 12 in Table 4) are produced except that the reduction inhibitor having the composition represented by the general formula:

$$d(MnO_2 + RO) + (1-d)(B_2O_3 + SiO_2)$$ or $$e(ZnO + RO) + (1-e)(B_2O_3 + SiO_2)$$

wherein RO is at least one component selected from the group consisting MgO, CaO, SrO and BaO, and d and e are constants, respectively, and containing the components in the proportions as shown in Tables 3 and 4 is added to the dielectric ceramic powder having the composition of $80Pb(Mg_{\frac{1}{3}}Nb_{\frac{2}{3}})O_3 - 15Pb(Zn_{\frac{1}{3}}Nb_{\frac{2}{3}})O_3 - 5PbTiO_3$ (mol %). The electrical characteristics are shown in Tables 3 and 4.

COMPARATIVE EXAMPLE 2

According to the same manner as described in Example 2, laminated ceramic condensers (sample No. 13 in Table 3 and sample No. 13 in Table 4) are produced except that any reduction inhibitor is not added. The electrical characteristics are shown in Tables 3 and 4.

TABLE 3

| Sample Nos. | Dielectric ceramic powder (wt %) | Reduction inhibitor (wt %) | Composition of Reducing inhibitor (mol %) | | | | | | | Sintering temperature (°C.) | Electric characteristics | | | Temperature characteristics |
|---|---|---|---|---|---|---|---|---|---|---|---|---|---|---|
| | | | $Mn_2O$ | BaO | CaO | SrO | MgO | $B_2O_3$ | $SiO_2$ | | Dielectric constant ($\epsilon$) | Dielectric loss (tan δ (%)) | Insulation resistance (Ω · cm) | |
| 1 | 99 | 1 | 6 | 54 | 0 | 0 | 0 | 20 | 20 | 1050 | 11500 | 2.6 | $\geq 10^{10}$ | F |
| 2 | 99 | 1 | 6 | 0 | 10 | 0 | 0 | 34 | 50 | 1000 | 9600 | 2.7 | " | F |
| 3 | 99 | 1 | 19 | 10 | 10 | 5 | 5 | 20 | 31 | 1030 | 11000 | 2.9 | " | F |
| 4 | 99 | 1 | 5 | 10 | 10 | 5 | 5 | 39 | 26 | 1000 | 10600 | 2.9 | " | F |
| 5 | 99 | 1 | 5 | 15 | 15 | 10 | 5 | 20 | 30 | 1000 | 11000 | 2.4 | " | F |
| 6 | 98 | 2 | " | " | " | " | " | " | " | 980 | 9600 | 2.2 | " | F |
| 7 | 95 | 5 | " | " | " | " | " | " | " | 950 | 5800 | 2.1 | " | E |
| 8 | 90 | 10 | " | " | " | " | " | " | " | 910 | 2000 | 1.8 | " | D |
| 9 | 85 | 15 | " | " | " | " | " | " | " | 890 | 1800 | 1.4 | " | C |
| 10 | 80 | 20 | " | " | " | " | " | " | " | 850 | 1400 | 0.8 | " | C |
| 11 | 70 | 30 | " | " | " | " | " | " | " | 770 | 950 | 0.2 | " | B |
| 12 | 60 | 40 | " | " | " | " | " | " | " | 730 | 590 | 0.1 | " | B |
| 13 | 100 | 0 | — | — | — | — | — | — | — | 1050 | 890 | 15.0 | $10^6$ | C |

Note:
Sample Nos. 1 to 12: Example. Sample No. 13: Comparative Example

TABLE 4

| Sample Nos. | Dielectric ceramic powder (wt %) | Reduction inhibitor (wt %) | Composition of reduction inhibitor (mol %) | | | | | | | Sintering temperature (°C.) | Electrical characteristics | | | Temperature characteristics |
|---|---|---|---|---|---|---|---|---|---|---|---|---|---|---|
| | | | ZnO | BaO | CaO | SrO | MgO | $B_2O_3$ | $SiO_2$ | | Dielectric constant ($\epsilon$) | Dielectric loss (tan δ (%)) | Insulation resistance (Ω · cm) | |
| 1 | 99 | 1 | 6 | 54 | 0 | 0 | 0 | 20 | 20 | 1050 | 12000 | 2.5 | $\geq 10^{10}$ | F |
| 2 | 99 | 1 | 6 | 0 | 10 | 0 | 0 | 34 | 50 | 1000 | 9900 | 2.7 | " | F |
| 3 | 99 | 1 | 19 | 10 | 10 | 5 | 5 | 20 | 31 | 1030 | 11500 | 2.9 | " | F |
| 4 | 99 | 1 | 5 | 10 | 10 | 5 | 5 | 39 | 26 | 1000 | 11000 | 2.8 | " | F |
| 5 | 99 | 1 | 5 | 15 | 15 | 10 | 5 | 20 | 30 | 1000 | 11200 | 2.5 | " | F |
| 6 | 98 | 2 | " | " | " | " | " | " | " | 980 | 9800 | 2.2 | " | F |
| 7 | 95 | 5 | " | " | " | " | " | " | " | 950 | 6000 | 2.1 | " | E |
| 8 | 90 | 10 | " | " | " | " | " | " | " | 910 | 2300 | 1.7 | " | D |
| 9 | 85 | 15 | " | " | " | " | " | " | " | 890 | 1900 | 1.5 | " | C |
| 10 | 80 | 20 | " | " | " | " | " | " | " | 850 | 1450 | 0.8 | " | C |

TABLE 4-continued

| Sample Nos. | Dielectric ceramic powder (wt %) | Reduction inhibitor (wt %) | Composition of reduction inhibitor (mol %) | | | | | | | Sintering temperature (°C.) | Electrical characteristics | | | |
|---|---|---|---|---|---|---|---|---|---|---|---|---|---|---|
| | | | ZnO | BaO | CaO | SrO | MgO | B₂O₃ | SiO₂ | | Dielectric constant (ε) | Dielectric loss (tan δ (%)) | Insulation resistance (Ω · cm) | Temperature characteristics |
| 11 | 70 | 30 | " | " | " | " | " | " | " | 770 | 950 | 0.2 | " | B |
| 12 | 60 | 40 | " | " | " | " | " | " | " | 730 | 600 | 0.1 | " | B |
| 13 | 100 | 0 | — | — | — | — | — | — | — | 1050 | 890 | 15.0 | 10⁶ | C |

Note:
Sample Nos. 1 to 12: Example, Sample No. 13: Comparative Example

EXAMPLE 3

According to the same manner as described in Example 1, monolithic ceramic capacitors (Sample Nos. 1 to 15 in Table 5) are produced except that the reduction inhibitor having the composition of $5Li_2O+5BaO+15CaO+10SrO+5MgO+20B_2O_3+30SiO_2$ (mol %) is added to the dielectric ceramic powder having the composition represented by the general formula:

$$dPb(Mg_{\frac{1}{2}}W_{\frac{1}{2}})O_3 - ePbTiO_3$$

wherein d and e are constants, respectively, and containing the components in the proportion as shown in Table 5. The electrical characteristics are shown in Table 5.

COMPARATIVE EXAMPLE 3

According to the same manner as described in Example 3, monolithic ceramic capacitors (Sample Nos. 16 to 20 in Table 5) are produced except that any reducing inhibitor is not added. The electrical characteristics are shown in Table 5.

paste for the internal electrode in place of the copper paste and, according to the same manner as described in Example 1, the electrical characteristics are determined. As the results, in the case of using the copper alloy paste, the same characteristics as those obtained in the case of using the copper paste are obtained.

In the case of using the copper alloy paste, conductivity and melting point of the copper alloy sometime vary depending upon the kind and amount of metals other than copper and, therefore, they should be selected so that they do not adversely affect the properties of the resulting capacitor in comparison with pure copper. Accordingly, the composition of a copper alloy paste is defined according to purposes of the monolithic capacitor and the composition of the dielectric ceramic containing lead oxide and the reduction inhibitor.

EXAMPLE 5

According to the same manner as described in Example 1, a monolithic ceramic capacitor is produced except that a paste wherein 5% by weight of glass frit having the composition of $30ZnO+30B_2O_3+40SiO_2$ (mol %) is added to the copper paste or copper alloy

TABLE 5

| Sample Nos. | Reduction inhibitor (wt %) | Dielectric powder (wt %) | Composition of dielectric powder (mol %) | | Sintering temperature (°C.) | Electric characteristics | | | |
|---|---|---|---|---|---|---|---|---|---|
| | | | a | b | | Dielectric constant ε | Dielectric loss tan δ (%) | Insulation resistance (Ω · cm) | Temperature characteristics |
| 1 | 1 | 99 | 40 | 60 | 1000 | 1430 | 3.1 | ≧10¹⁰ | B |
| 2 | 1 | 99 | 50 | 50 | 1000 | 9600 | 1.2 | " | F |
| 3 | 1 | 99 | 60 | 40 | 980 | 4200 | 1.1 | " | B |
| 4 | 1 | 99 | 70 | 30 | 1010 | 2550 | 0.8 | " | B |
| 5 | 1 | 99 | 80 | 20 | 1040 | 1150 | 0.3 | " | B |
| 6 | 10 | 90 | 40 | 60 | 930 | 310 | 1.3 | " | B |
| 7 | 10 | 90 | 50 | 50 | 920 | 2200 | 0.8 | " | D |
| 8 | 10 | 90 | 60 | 40 | 900 | 1600 | 0.8 | " | B |
| 9 | 10 | 90 | 70 | 30 | 920 | 1100 | 0.1 | " | B |
| 10 | 10 | 90 | 80 | 20 | 940 | 290 | 0.1 | " | B |
| 11 | 30 | 70 | 40 | 60 | 800 | 110 | 0.3 | " | B |
| 12 | 30 | 70 | 50 | 50 | 800 | 730 | 0.2 | " | C |
| 13 | 30 | 70 | 60 | 40 | 790 | 420 | 0.1 | " | B |
| 14 | 30 | 70 | 70 | 30 | 800 | 320 | 0.05 | " | B |
| 15 | 30 | 70 | 80 | 20 | 800 | 110 | 0.01 | " | B |
| 16 | 0 | 100 | 40 | 60 | 1020 | 110 | 31.0 | 10⁶ | B |
| 17 | 0 | 100 | 50 | 50 | 1020 | 200 | 30.0 | 10⁶ | C |
| 18 | 0 | 100 | 60 | 40 | 1000 | 80 | 40.0 | 10⁶ | B |
| 19 | 0 | 100 | 70 | 30 | 1030 | 60 | 20.0 | 10⁶ | B |
| 20 | 0 | 100 | 80 | 20 | 1050 | 45 | 24.0 | 10⁶ | B |

Note:
Sample Nos. 1 to 10: Example
a: $Pb(Mg_{1/3}W_{1/2})O_3$  b: $PbTiO_3$
Sample Nos. 11 to 16: Example
Sample Nos. 17 to 20: Comparative Example

EXAMPLE 4

According to the same manner as described in Example 1, a monolithic ceramic capacitor is produced except that a copper alloy paste having the composition of 5Pt-95Cu (atomic %) or a copper alloy paste having the composition of 8Pd-92Cu (atomic %) is used as a metal paste having the composition of 5Pt-95Cu (atomic %), a paste wherein 5% by weight of the dielectric ceramic powder having the composition of $80Pb(Mg_{\frac{1}{3}}Nb_{\frac{2}{3}})O_3 - 15Pb(Zn_{\frac{1}{3}}Nb_{\frac{2}{3}})O_3 - 5PbTiO_3$ (mol %) is added thereto, a paste wherein 5% by weight of the reduction inhibitor having the composition of 5Li₂O +15BaO+15CaO+10SrO+5MgO+20B$_2$O$_3$+30SiO$_2$ (mol %) is added thereto, or a paste wherein 3% by weight of the dielectric ceramic powder and 2% by weight of the reduction inhibitor is added is used as a metal paste for the internal electrode in place of the copper paste and, according to the same manner as described in Example 1, the electrical characteristics are determined. As the results, by using the paste containing such additives, the same properties as those obtained by using pure copper paste are obtained.

The amount of glass frit, dielectric ceramic powder, or a mixture of dielectric ceramic powder and reduction inhibitor to be added is selected so that properties of the monolithic capacitor is not deteriorated, and it is preferably not more than 40% by weight.

As seen from the results of Examples 1 to 5, it has been found that the monolithic ceramic capacitor of the present invention has a high dielectric constant as well as excellent insulation resistance of not less than 10$^{10}$ Ω cm. To the contrary, the electric characteristics such as dielectric loss and insulation resistance of the capacitors of Comparative Examples 1 to 3 are extremely inferior and are not suitable for the practical use as a capacitor.

We claim:

1. A monolithic ceramic capacitor which comprises a laminate composed of a plurality of dielectric ceramic layers and internal electrode layers provided between said dielectric ceramic layers, and external electrodes provided at both ends of said laminate and electrically connected to said internal electrode layers, said dielectric ceramic layer being a dielectric ceramic containing lead oxide and a reduction inhibitor and said internal electrode layer being copper or a copper alloy and, wherein the reduction inhibitor is a material having the composition represented by the general formula:

$$d(MnO_2+RO)+(1-d)(B_2O_3+SiO_2)$$

$$e(ZnO+RO)+(1-e)(B_2O_3+SiO_2), \text{ or}$$

$$aLi_2O+bRO+cB_2O_3+(1-a-b-c)SiO_2$$

wherein RO is at least one component selected from the group consisting of MgO, CaO, SrO and BaO, and a, b, c, d and e are constants, respectively.

2. A monolithic ceramic capacitor according to claim 1, wherein the internal electrode is copper or a copper alloy which contains glass frit.

3. A monolithic ceramic capacitor according to claim 1, wherein the internal electrode is copper or a copper alloy which contains the dielectric powder and/or reduction inhibitor.

4. A monolithic ceramic capacitor according to claim 1, wherein the reduction inhibitor is present in an amount of 0.05 to 5% by weight based on the weight of the dielectric ceramic.

5. A monolithic ceramic capacitor according to claim 4, wherein the dielectric ceramic containing lead oxide is represented by the formula aPb(Mg$_\frac{1}{3}$Nb$_\frac{2}{3}$)O$_3$−bPb(zn$_\frac{1}{3}$Nb$_\frac{2}{3}$)O$_3$−cPbTIO$_3$ wherein a, b and c are constants, respectively.

* * * * *